(12) United States Patent
Baba et al.

(10) Patent No.: US 6,522,448 B2
(45) Date of Patent: Feb. 18, 2003

(54) OPTICAL ELEMENT

(75) Inventors: Toshihiko Baba, Yamato (JP); Takeharu Tani, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/941,740

(22) Filed: Aug. 30, 2001

(65) Prior Publication Data

US 2002/0041425 A1 Apr. 11, 2002

(30) Foreign Application Priority Data

Sep. 1, 2000 (JP) ........................................ 2000-265433

(51) Int. Cl.[7] .............................. G02F 1/03; G02F 1/29; G03C 3/00; G03C 5/00
(52) U.S. Cl. ........................ 359/241; 359/299; 359/320; 359/321; 359/652; 359/385; 359/16; 359/430; 359/18; 359/290
(58) Field of Search .................................. 359/241, 321, 359/652–655, 299, 320; 385/16; 430/18, 290

(56) References Cited

U.S. PATENT DOCUMENTS

| | | | | |
|---|---|---|---|---|
| 6,040,936 A | * | 3/2000 | Kim et al. ................... | 359/245 |
| 6,064,506 A | * | 5/2000 | Koops ......................... | 359/320 |
| 6,381,389 B1 | * | 4/2002 | Kosaka ......................... | 385/36 |
| 6,433,931 B1 | * | 8/2002 | Fink et al. .................... | 359/241 |
| 2001/0012149 A1 | * | 8/2001 | Lin et al. ..................... | 359/344 |
| 2002/0027696 A1 | * | 3/2002 | Baba et al. .................. | 359/196 |
| 2002/0048422 A1 | * | 4/2002 | Cotteverte et al. ............. | 385/4 |
| 2002/0070352 A1 | * | 6/2002 | Allan et al. .............. | 250/492.1 |
| 2002/0109134 A1 | * | 8/2002 | Iwasaki et al. ................ | 257/13 |

OTHER PUBLICATIONS

H. Kosaka, et al. "Superprism phenomena in photonic crystals", Physical Review B vol. 58, No. 16, 1998.

* cited by examiner

Primary Examiner—Evelyn A Lester
(74) Attorney, Agent, or Firm—Sughrue Mion, PLLC

(57) ABSTRACT

An optical element has a small reflection loss of light on a boundary surface between a photonic crystal and the normal medium. The optical element includes: a normal medium region having a first refractive index; a photonic crystal region having a refractive index which is changed periodically depending upon a position thereof, the photonic crystal region having as an averaged refractive index a second refractive index different from the first refractive index; and an intermediate region interposed between the normal medium region and the photonic crystal region, the intermediate region having a refractive index which is gradually changed from the first refractive index to the second refractive index.

20 Claims, 10 Drawing Sheets

OPTICAL ELEMENT

BACKGROUND OF THE INVENTION

1. Field of the Invention

The present invention generally relates to an optical element. More specifically, the present invention is directed to an optical element with employment of photonic crystals, refractive indexes of which are changed periodically, depending upon positions thereof.

2. Description of a Related Art

Very recently, photonic crystals have been effectively developed, which represent peculier dispersion characteristics, as compared with the conventional optical crystals. Thus, these photonic crystals are strongly expected to be applied to various sorts of optical elements such as optical modulation elements, optical deflection element, and switching elements. Since a photonic crystal is structured in such a manner that within a first material, second materials whose refractive index is different from that of the first material are arranged at an interval corresponding to a wavelength of light, this photonic crystal owns such a characteristic that the refractive index thereof is changed periodically, depending upon the positions of this photonic crystal.

The above-described characteristic represented by such a photonic crystal is described in detail, for instance, in the publication "Superprism phenomena in photonic crystals" written by H. Kosaka et al., in Physical Review B Vol. 58, No. 16, Oct. 15, 1998.

However, in the conventional optical elements with employment of the above-described photonic crystals, there are large optical reflection losses occurred in boundary surfaces between the photonic crystals and the normal media, which constitutes a problem to be solved, and also which has been revealed by the extensive analyses made by inventors of the present invention.

SUMMARY OF THE INVENTION

The present invention has been made to solve the above-explained problem and therefore, has an object to provide an optical element having a small light reflection loss produced in a boundary surface between a photonic crystal and the normal medium.

To achieve the above-described object, an optical element according to one aspect of the present invention includes: a normal medium region having a first refractive index; a photonic crystal region having a refractive index which is changed periodically depending upon a position thereof, the photonic crystal region having as an averaged refractive index a second refractive index different from the first refractive index; and an intermediate region interposed between the normal medium region and the photonic crystal region, the intermediate region having a refractive index which is gradually changed from the first refractive index to the second refractive index.

In accordance with the present invention, since the refractive index in the intermediate region is gradually changed from the first refractive index to the second refractive index, a mismatching problem of an impedance occurred between the normal medium region and the photonic crystal region can be gradually solved in the intermediate region. As a result, a reflection loss of light occurred in a boundary surface between the photonic crystal region and the normal medium region can be suppressed.

DESCRIPTION OF THE PREFERRED EMBODIMENTS

Figure 1:
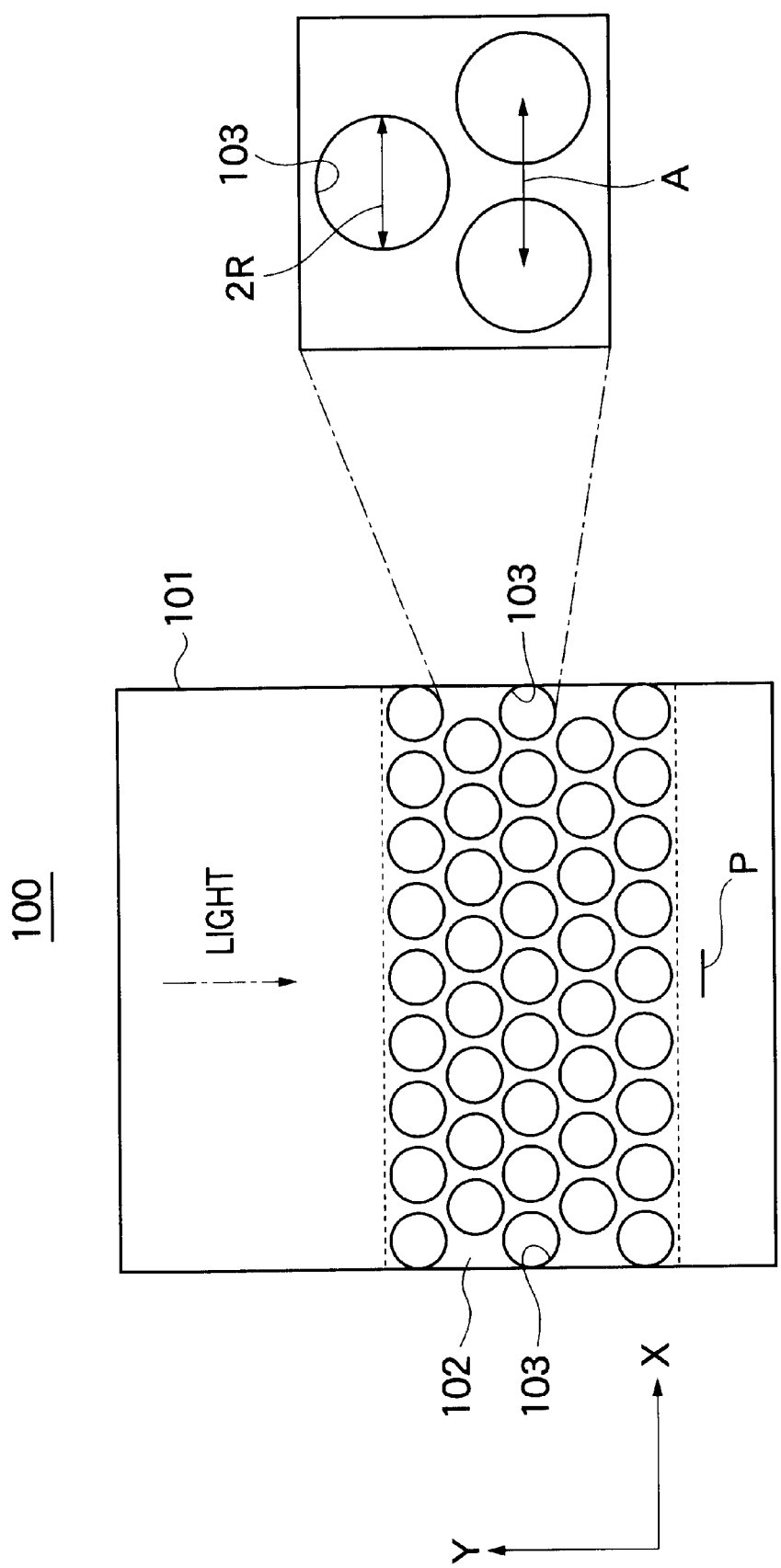
FIG. 1 is a plan view indicating a general structure of an optical element.

Referring now to drawings, various preferred embodiments of the present invention will be described in detail. It should be understood that the same reference numerals will be employed as those for indicating the same, or similar structural elements, and therefore, explanations thereof are omitted. It should also be noted that since the below-mentioned various numeral values employed in the respective embodiments correspond to typical values, the present invention is not limited to those typical numeral values, but may be applied to other values within the technical scope of the present invention.

FIG. 1 is a plan view schematically indicating a general-purpose structure of an optical element 100 constituted in such a manner that a photonic crystal region 102 is formed in a central portion of a substrate 101 made of a silicon material.

In the photonic crystal region 102 as shown in FIG. 1, a plurality of cylindrical holes 103 are formed in five layers, and are arranged in a two-dimensional triangular lattice shape in such a way that these holes 103 are positioned perpendicular to a propagation direction of light. Air is filled with these holes 103. In the first embodiment, while an effective refractive index of the substrate 101 is set to 3.065, in such a case where a wavelength of light of interest propagated in a vacuum atmosphere is equal to, for example, 1.55 $\mu$m, a radius R of one hole 103 is selected to be 0.387 $\mu$m, and also a pitch A of the arranged holes 103 is selected to be 0.93 $\mu$m.

Such a photonic crystal region 102 is fabricated in such a manner that, for instance, after resist has been made on a portion over the substrate 101, where the holes 103 are not formed, the resultant substrate 101 is treated by a dry etching process having a superior vertical characteristic.

Figure 2:
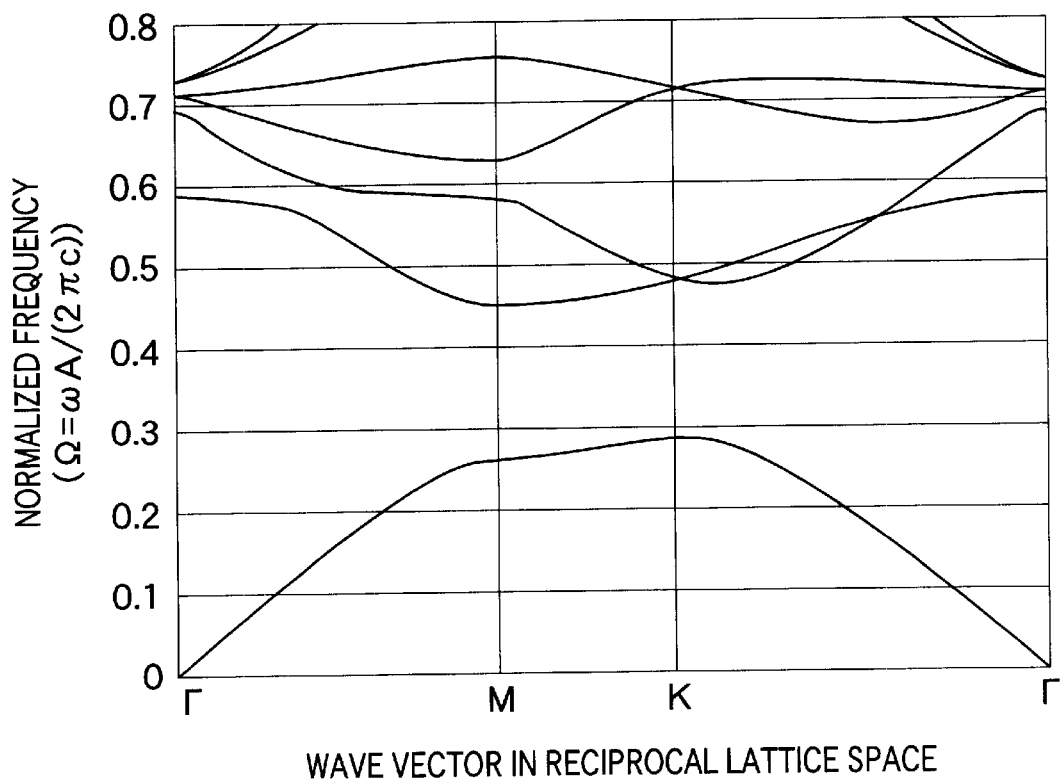
FIG. 2 represents a photonic band diagram for explaining such a case where light is propagated into the photonic crystal region as shown in FIG. 1 in parallel to the plane of this drawing, and a plane of polarization of this light is located in parallel to the plane of this drawing.

Light propagated through a photonic crystal is adversely influenced by a multiple scattering phenomenon caused by a periodic (cyclic or alternate) structure of this photonic crystal. This propagation characteristic may be explained with reference to a photonic band diagram which is similar to an electron band diagram in a semiconductor. For instance, in such a case where light is propagated through the photonic crystal region 102 as shown in FIG. 1 in parallel to a plane of this drawing, and further, a plane of polarization of this light is located in parallel to the plane of this drawing, such a photonic band diagram (reduced zone scheme) as shown in FIG. 2 is obtained. A photonic band diagram may give a relationship between a wave vector and a normalized frequency $\Omega=\omega A/(2\pi c)$ in a reciprocal lattice space. It should be noted that "$\omega$" represents an angular frequency of light, "A" represents an arrangement pitch of holes, and "c" represents a light velocity in a vacuum atmosphere.

Figure 3:
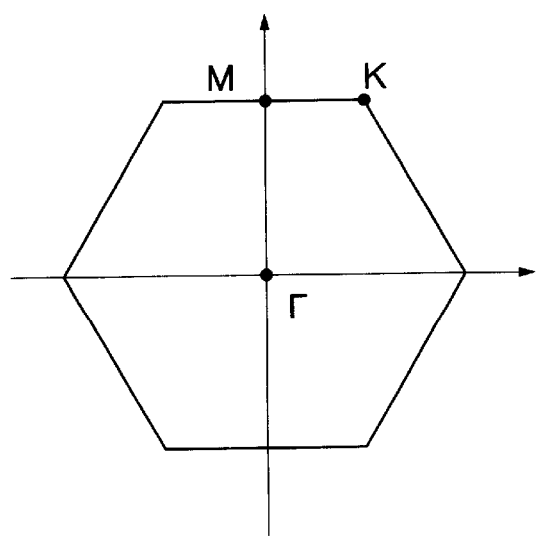
FIG. 3 is a diagram illustratively showing a first Brillouin zone of the photonic crystal as shown in FIG. 1 which is sliced at a specific normalized frequency.

Also, it should be understood that "$\Gamma$", "M", "K" given to an abscissa in FIG. 2 indicate specific wave vectors in a first Brillouin zone as shown in FIG. 3.

As indicated in FIG. 2, there is such a normalized frequency band (namely, photonic band gap), in which light can not be propagated through a photonic crystal, within a photonic band. As a consequence, such light existing in a normalized frequency band lower than the photonic band gap or higher than the photonic band gap may be propagated through the photonic crystal. In FIG. 2, a normalized frequency band from 0.29 to 0.45 corresponds to the photonic band gap. Also, in a normalized frequency band (namely, a propagation band) from 0.45 to 0.80, there is such light propagated through the photonic crystal region 102 toward a minus direction of the Y-axis (namely, wave vectors of point "$\Gamma$" to point "M").

When an optical element is manufactured by utilizing a transmission characteristic of a photonic crystal with respect to light, losses of such light belonging to the propagation band of the photonic crystal become low in an ideal condition, which losses may occur when this light transmits through the photonic crystal. As a consequence, the inventors of the present invention calculated both a transmittance and a reflectance on the basis of intensity of light obtained from the following simulation. That is, Gaussian distribution pulse light belonging to the normalized frequency band from 0.5 to 0.75 as shown in FIG. 2 is propagated toward an arrow direction as shown in FIG. 1, and the intensity of the light is simulated at a position P which is just after the Gaussian distribution pulse light had been projected from the photonic crystal region 102. Both the transmittance and a reflectance were calculated based upon the intensity of light obtained from a simulation. It should also be noted that this simulation has been carried out by employing the FDTD (finite difference time domain) method which is generally utilized in a numeral analysis of a photonic crystal.

Figure 4:
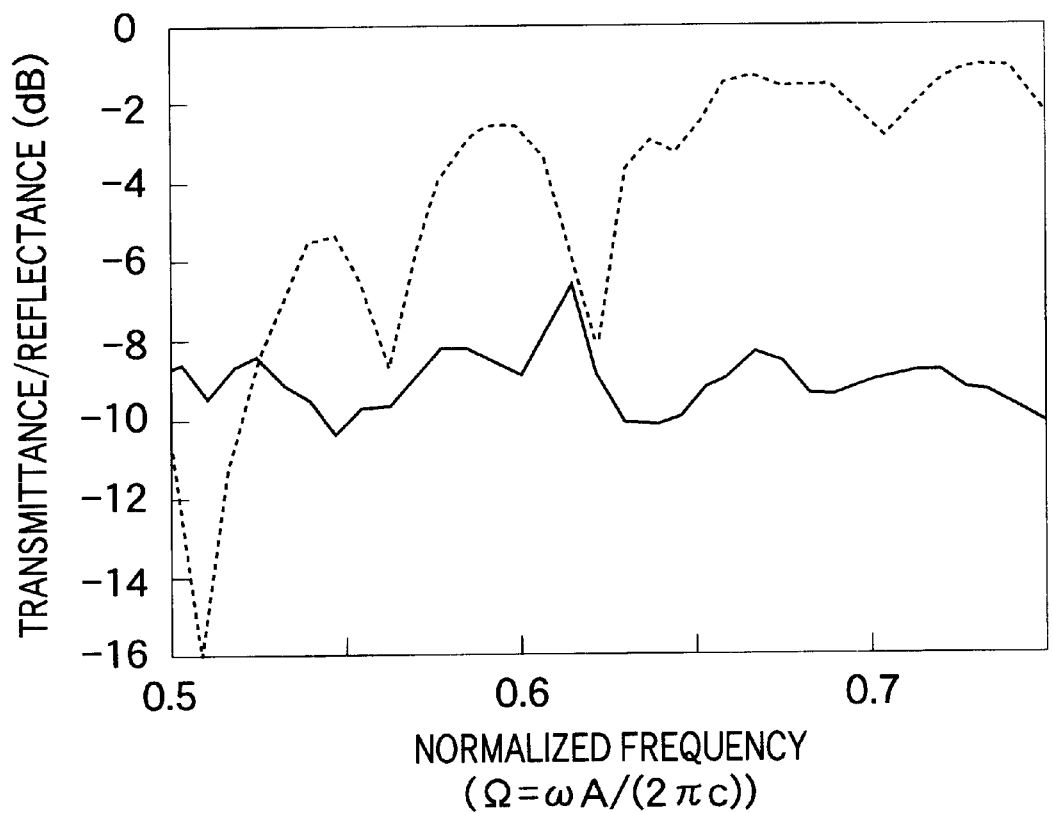
FIG. 4 is a graphic representation graphically showing a relationship among a normalized frequency, a transmittance, and a reflectance in a case where light belonging to a propagation band of the photonic crystal region as shown in FIG. 1 is propagated through this propagation band.

FIG. 4 graphically represents a relationship among the normalized frequency, the transmittance, and the reflectance, which are obtained in the above-explained calculation. In FIG. 4, a solid line indicates the transmittance, and a broken line indicates the reflectance. As shown in FIG. 4, although the light which belongs to the propagation region of the photonic crystal region 102 as shown in FIG. 1 is propagated through this photonic crystal region 102, the transmittance is equal to −8 dB to −10 dB. Thus, intensity of the light measured after transmitting through the photonic crystal region 102 is dropped by appropriately 1 digit than intensity of the light measured before transmitting through it. Further, the reflectance of the light at the boundary surface of the photonic crystal region 102 is high, which light belongs to the propagation region of this photonic crystal region 102. As a result, it is predicted that a reflection loss occurred at the boundary surface of the photonic crystal region 102 may constitute a main reason why the intensity of the light transmitting through this photonic crystal region 102 is lowered. Such a reflection loss is improper in the case where the transmission light belonging to the propagation region of the photonic crystal is utilized because the S/N ratio of the output signal would be deteriorated, and further, the high power of the light source should be required.

In this photonic crystal region 102, as also apparent from the area ratio, since the holes 103 are predominant, an averaged refractive index of the photonic crystal region 102 becomes lower than that of silicon. An averaged refractive index $N_{AV}$ of such a photonic crystal region in which holes are arranged in a two-dimensional triangular lattice form is given in accordance with the following formula (1):

$$N_{AV} = N_1 \pi R^2 + N_2 \left\{ \frac{\sqrt{3}}{2} A^2 - \pi R^2 \right\} \quad (1)$$

where:

$N_1$ indicates a refractive index of a material filled into a hole, and $N_2$ indicates a refractive index of a background material.

For instance, when the below-mentioned numerals are applied to the above-explained formula (1), the averaged refractive index $N_{AV}$ is equal to 1.32. That is, $N_1=1$, $N_2=3.065$, $A=0.93$ $\mu$m, and $R=0.387$ $\mu$m. In this case, assuming now that the refractive index N of the material of the normal medium region is equal to 3.065, a ratio of this refractive index N to the averaged refractive index $N_{AV}$ becomes 2.3, namely represents a large value. As a result, it is so conceived that even when such light belonging to the propagation band of the photonic crystal is employed, since a mismatching of impedance at a boundary surface between the photonic crystal and the normal medium is high, the light is strongly reflected from the boundary surface. Then, if the ratio of the refractive index N to the averaged refractive index $N_{AV}$ becomes such a value larger than 2.3, then the light is further strongly reflected on the boundary surface between the photonic crystal and the normal medium.

Under such a circumstance, the inventors of the present invention have tried to increase transmittances of light which belongs to the propagation region of the photonic crystal by interposing the below-mentioned intermediate region between the normal medium region and the photonic crystal region.

Figure 5:
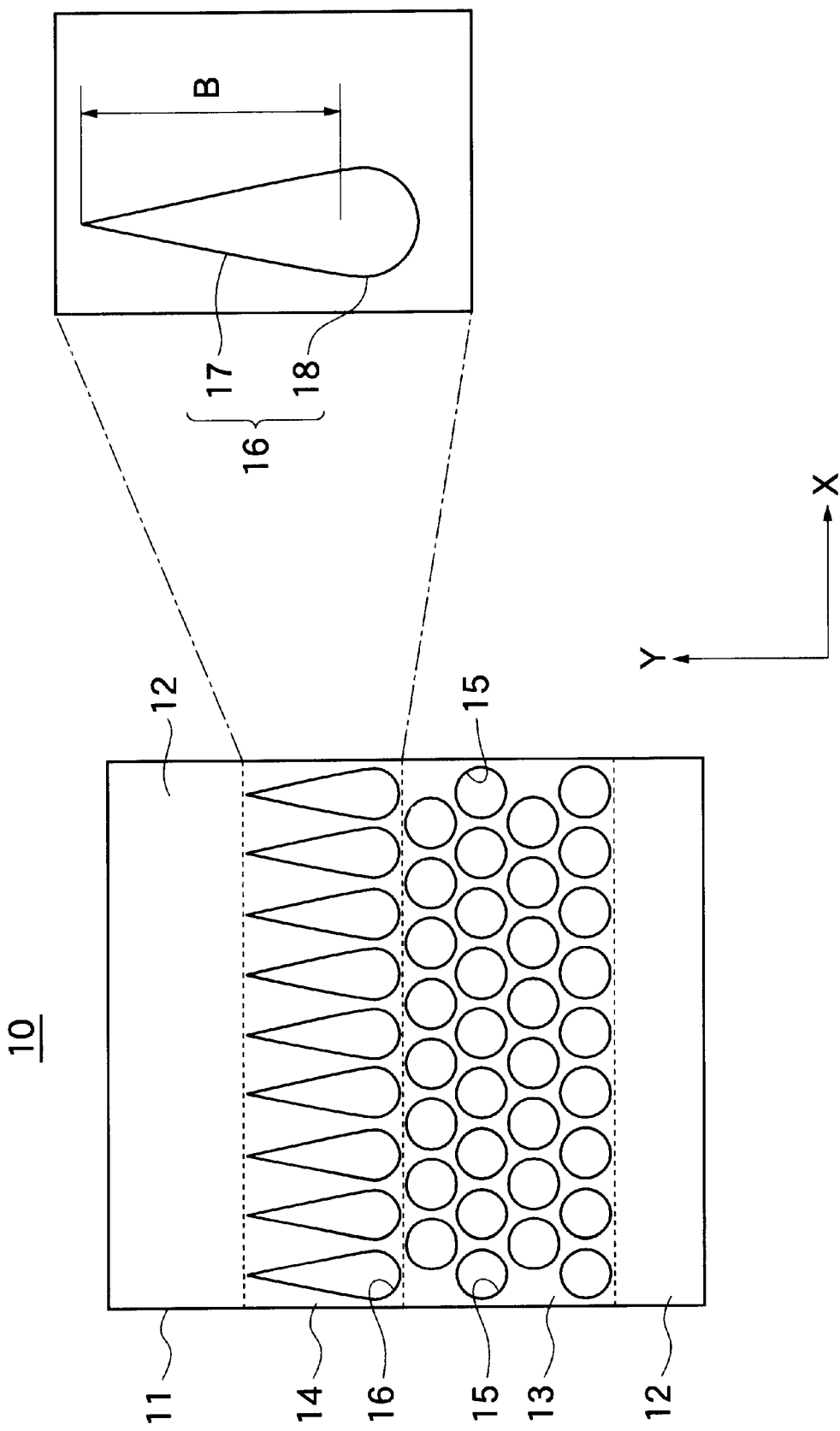
FIG. 5 is a plan view indicating a structural of an optical element according to a first embodiment of the present invention.
Figure 6:
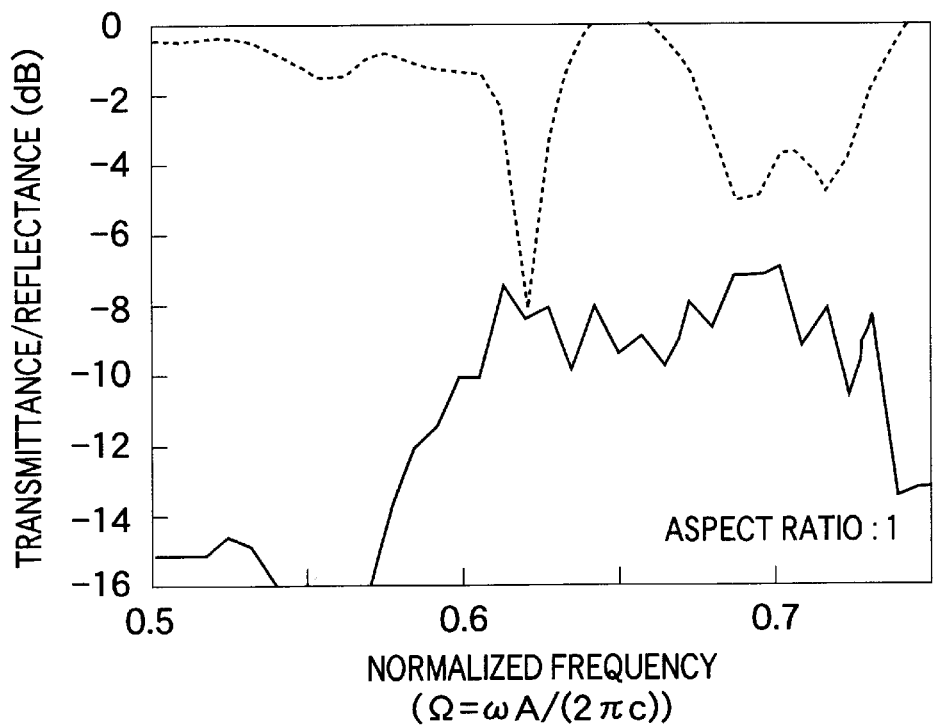
FIG. 6 is a diagram representing a relationship among a normalized frequency, a transmittance, and a reflectance in such a case where the light belonging to the propagation band of the photonic crystal region as shown in FIG. 5 is propagated through this propagation band while an aspect ratio in an intermediate region indicated in FIG. 5 is set to one.
Figure 7:
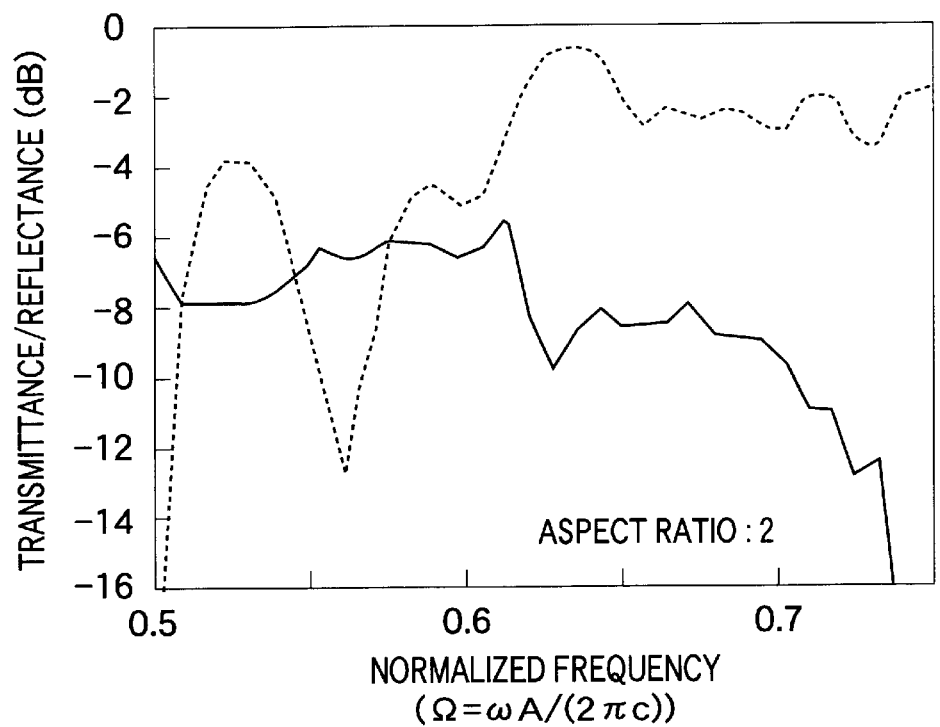
FIG. 7 is a diagram representing a relationship among a normalized frequency, a transmittance, and a reflectance in such a case where the light belonging to the propagation band of the photonic crystal region as shown in FIG. 5 is propagated through this propagation band while the aspect ratio in the intermediate region indicated in FIG. 5 is set to two.
Figure 8:
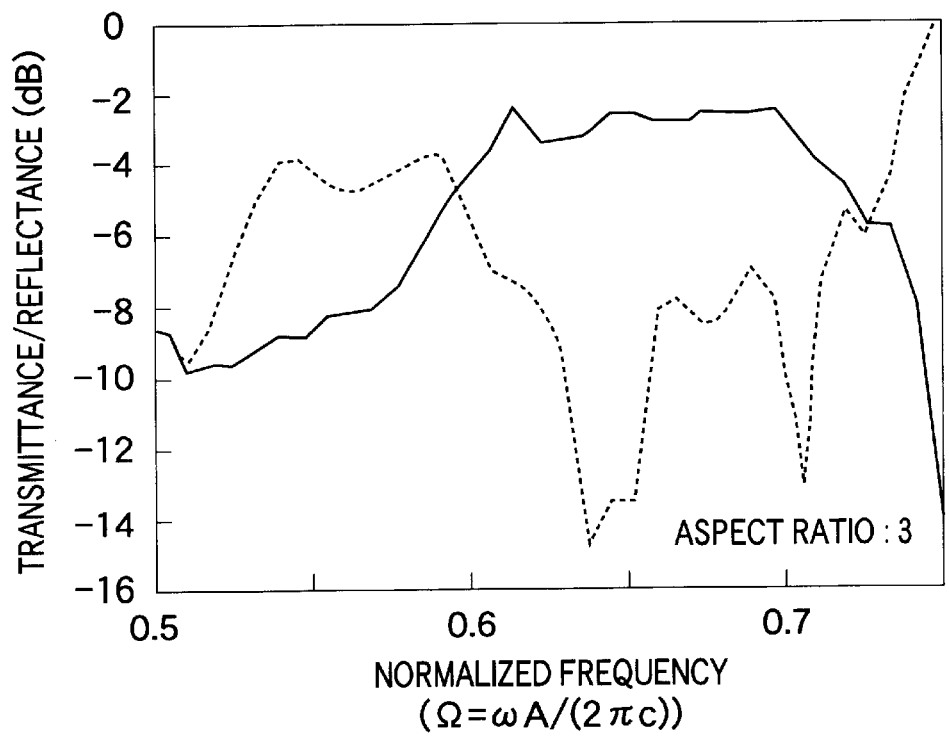
FIG. 8 is a diagram representing a relationship among a normalized frequency, a transmittance, and a reflectance in such a case where the light belonging to the propagation band of the photonic crystal region as shown in FIG. 5 is propagated through this propagation band while the aspect ratio in the intermediate region indicated in FIG. 5 is set to three.
Figure 9:
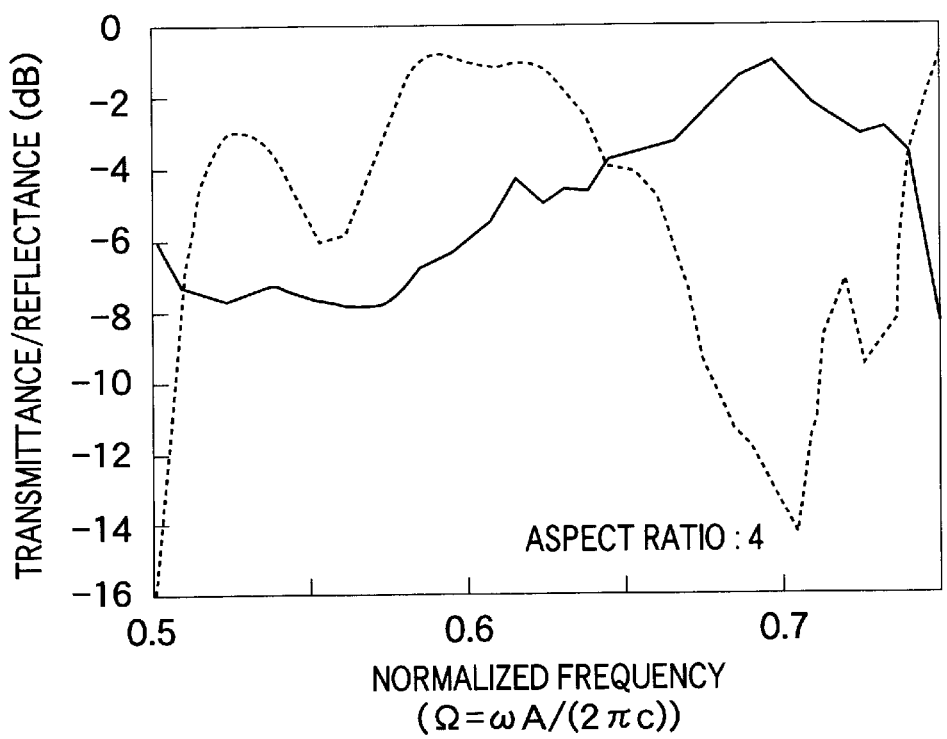
FIG. 9 is a diagram representing a relationship among a normalized frequency, a transmittance, and a reflectance in such a case where the light belonging to the propagation band of the photonic crystal region as shown in FIG. 5 is propagated through this propagation band while the aspect ratio in the intermediate region indicated in FIG. 5 is set to four.
Figure 10:
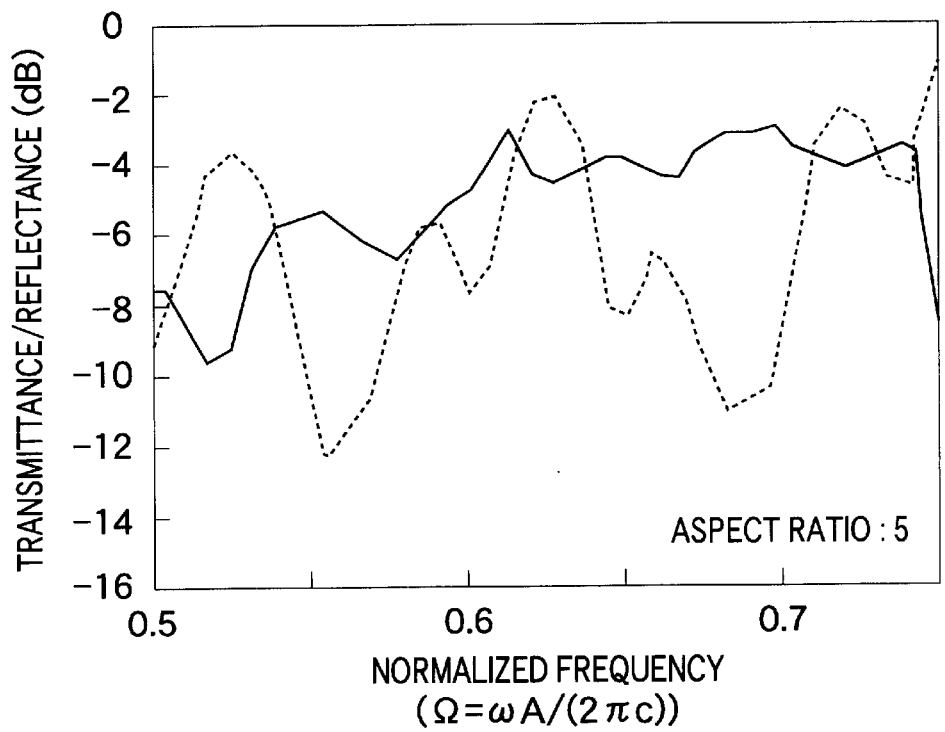
FIG. 10 is a diagram representing a relationship among a normalized frequency, a transmittance, and a reflectance in such a case where the light belonging to the propagation band of the photonic crystal region as shown in FIG. 5 is propagated through this propagation band while the aspect ratio in the intermediate region indicated in FIG. 5 is set to five.
Figure 11:
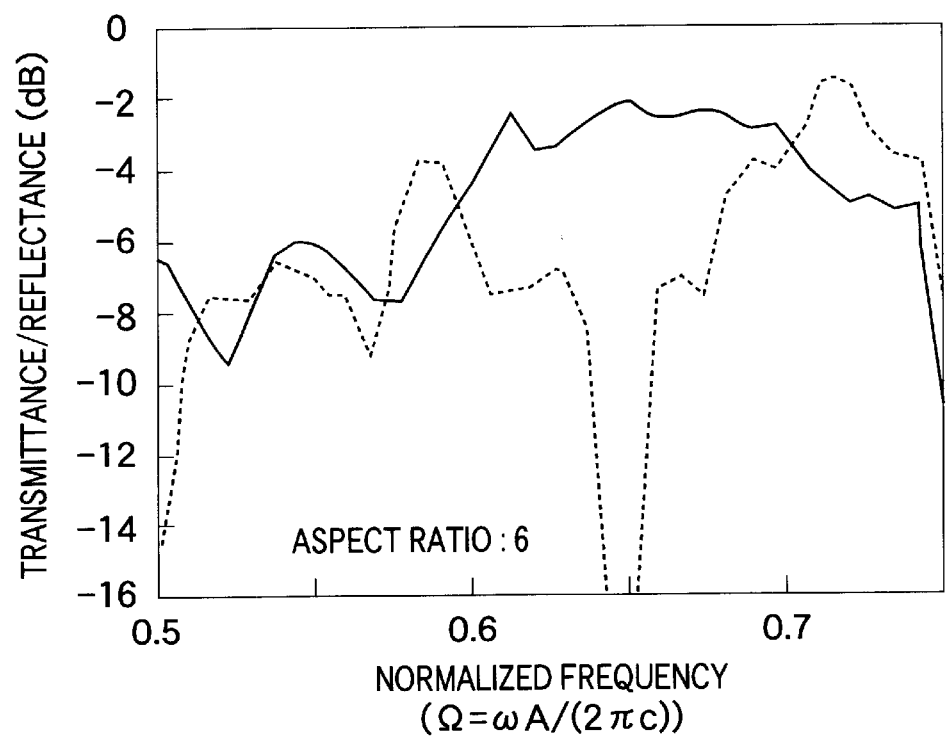
FIG. 11 is a diagram representing a relationship among a normalized frequency, a transmittance, and a reflectance in such a case where the light belonging to the propagation band of the photonic crystal region as shown in FIG. 5 is propagated through this propagation band while the aspect ratio in the intermediate region indicated in FIG. 5 is set to six.
Figure 12:
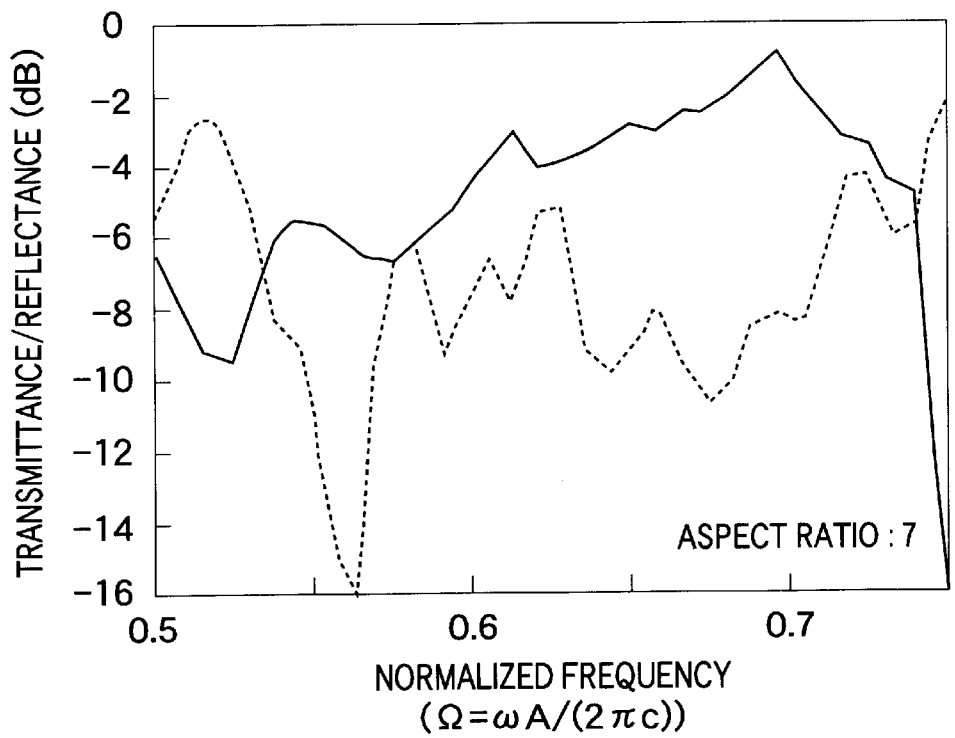
FIG. 12 is a diagram representing a relationship among a normalized frequency, a transmittance, and a reflectance in such a case where the light belonging to the propagation band of the photonic crystal region as shown in FIG. 5 is propagated through this propagation band while the aspect ratio in the intermediate region indicated in FIG. 5 is set to seven.
Figure 13:
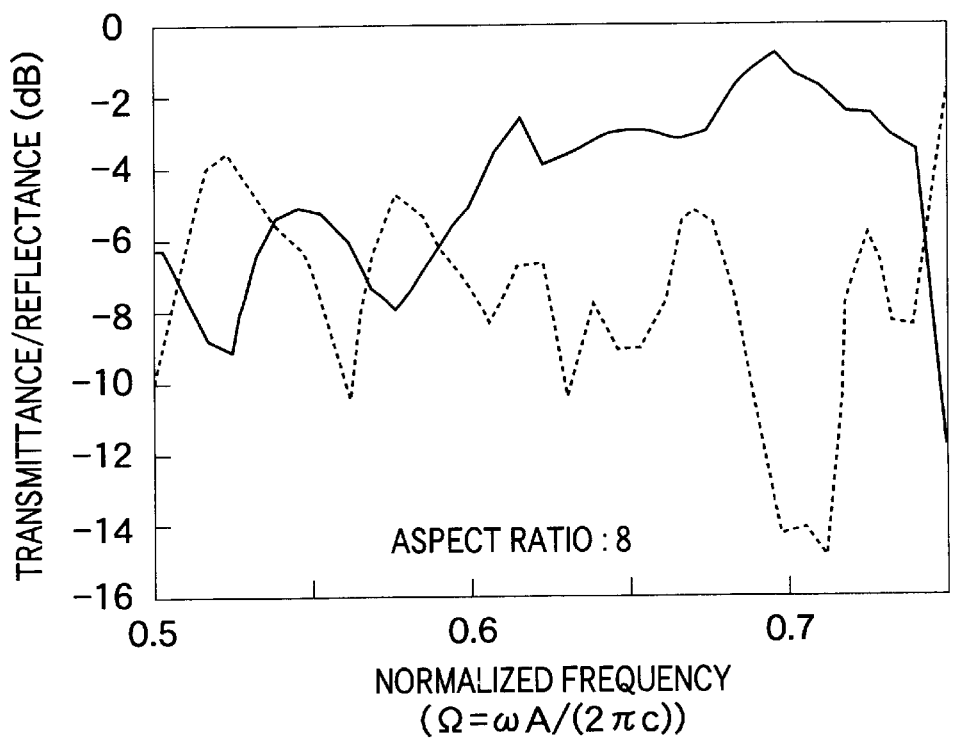
FIG. 13 is a diagram representing a relationship among a normalized frequency, a transmittance, and a reflectance in such a case where the light belonging to the propagation band of the photonic crystal region as shown in FIG. 5 is propagated through this propagation band while the aspect ratio in the intermediate region indicated in FIG. 5 is set to eight.
Figure 14:
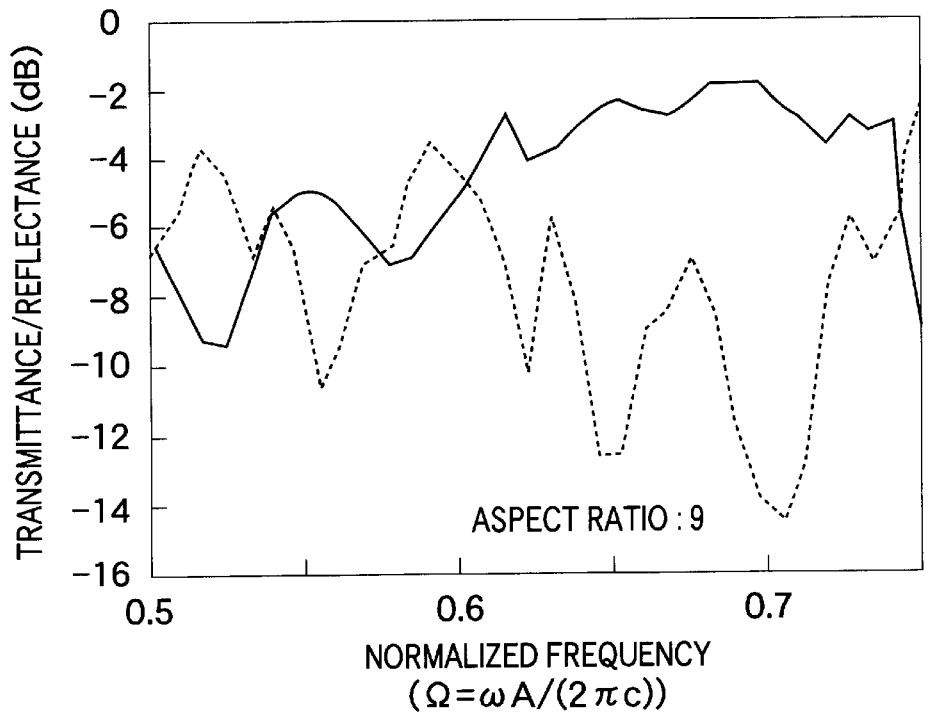
FIG. 14 is a diagram representing a relationship among a normalized frequency, a transmittance, and a reflectance in such a case where the light belonging to the propagation band of the photonic crystal region as shown in FIG. 5 is propagated through this propagation band while the aspect ratio in the intermediate region indicated in FIG. 5 is set to nine.
Figure 15:
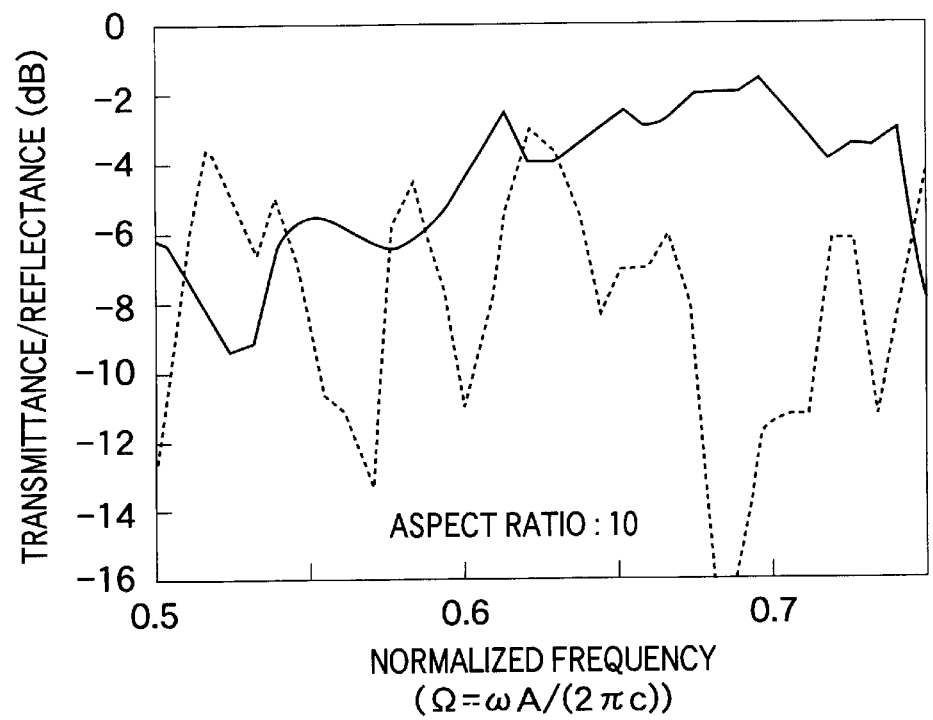
FIG. 15 is a diagram representing a relationship among a normalized frequency, a transmittance, and a reflectance in such a case where the light belonging to the propagation band of the photonic crystal region as shown in FIG. 5 is propagated through this propagation band while the aspect ratio in the intermediate region indicated in FIG. 5 is set to ten.

FIG. 5 is a plan view schematically showing a structure of an optical element according to a first embodiment of the present invention.

As indicated in this drawing, an optical element 10 is arranged in such a manner that a photonic crystal region 13 is formed at a central portion of a substrate 11 including silicon as a medium, and furthermore, an intermediate 14 is formed between a normal medium region 12 located at an upper portion of the substrate 11 and the photonic crystal region 13.

In the photonic crystal region 13, a plurality of holes 15 having cylinder shapes are arranged in a two-dimensional triangular lattice shape, and these holes 15 are filled with air. On the other hand, in the intermediate region 14, holes 16 having projection portions 17 are arranged at an regular interval along one lateral column (namely, plus direction of the X-axis). The projection portions 17 are tapered and have sharp edges toward the normal medium region 12, and lower halves of the projection portions 17 are united to semi-cylindrical portions 18. Similar to the photonic crystal region 13, these holes 16 are filled with air.

The inventors of the present invention measured both a transmittance and a reflectance of light belonging to the propagation band of the photonic crystal region 13 with respect to this photonic crystal region 13, while an aspect ratio is changed. This aspect ratio is defined between a length B of the projection portions 17 of the holes 16 formed in the intermediate region 14 and a pitch A among these holes 15 formed in the photonic crystal region 13. FIGS. 6–15 are graphic diagrams graphically showing relations among normalized frequencies, transmittances, and reflectances in the respective cases where the aspect ratios are selected to be one to ten. It should also be noted that in these graphic diagrams, a solid line indicates a transmittance, and a broken line indicates a reflectance. As shown in these graphic representations, the following fact can be seen. That is, when the aspect ratio is selected to be larger than, or equal to 3, the transmittances of the light belonging to the propagation region of the photonic crystal with respect to this photonic crystal are increased over a wide portion of the propagation range (namely, a normalized frequency band from 0.5 to 0.75) of this photonic crystal. Thus, it may be apparent that the transmittance may be improved by 4 dB to 5 dB in an average value. In this case, it is so assumed that a ratio of an averaged refractive index of the intermediate region 14 to an averaged refractive index of the photonic crystal region 13 is selected to be smaller than 2.3.

In the first embodiment, since the holes 16 arranged in the intermediate region 14 are tapered toward the normal medium region 12, the refractive index in the intermediate region 14 is gradually decreased from the refractive index of the normal medium region 12 to the averaged refractive index of the photonic crystal region 13. As a result, the mismatching problem of the impedance occurred between the normal medium region 12 and the photonic crystal region 13 may be gradually solved in the intermediate region 14, so that the reflection loss of the light produced at the boundary of the photonic crystal region 13 can be suppressed.

As previously explained, when the ratio of the refractive index N of the normal medium region 12 to the averaged refractive index $N_{AV}$ of the photonic crystal region 13 becomes larger than 2.3, the light is strongly reflected on the boundary surface between the normal medium region 12 and the photonic crystal region 13. However, since the above-explained intermediate region 14 is newly provided, the reflection loss of the light occurred at the boundary surface of the photonic crystal region 13 can be suppressed similar to the above-explained embodiment.

Figure 16:
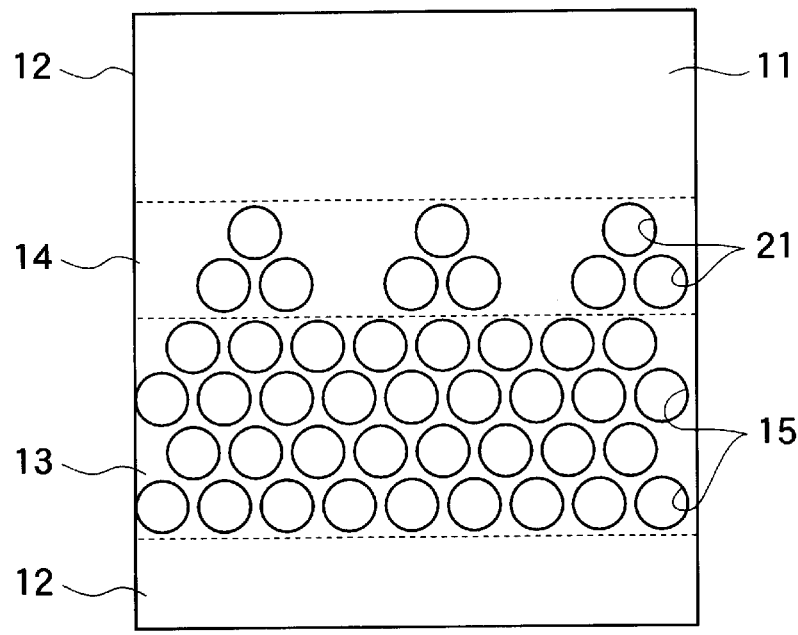
FIG. 16 is a plan view indicating a structure of an optical element according to a second embodiment of the present invention.

FIG. 16 is a plan view schematically showing a structure of an optical element 20 according to a second embodiment of the present invention.

In an intermediate region 14 of an optical element 20, a plurality of cylindrical-shaped holes 21 is arranged in a two-dimensional triangular lattice form in a pitch which is larger than that in a photonic crystal region 13, and these holes 21 are filled with air.

In the second embodiment, since the holes 21 having the same shapes as those of the hole 15 of the photonic crystal region 13 (as explained in the first embodiment) are arranged in the intermediate region 14 in lower density than that of the photonic crystal region 13, a mismatching problem of an impedance between the normal medium region 12 and the photonic crystal region 13 may be gradually solved. As a result, a similar effect to that of the first embodiment can be achieved in accordance with the second embodiment.

Figure 17:
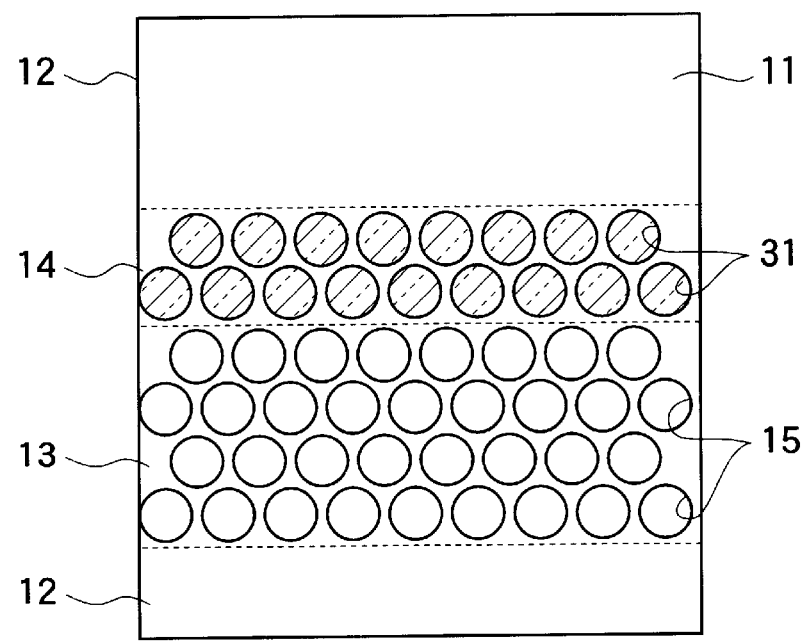
FIG. 17 is a plan view showing a structure of an optical element according to a third embodiment of the present invention.

FIG. 17 is a plan view schematically showing a structure of an optical element 30 according to a third embodiment of the present invention.

In an intermediate region 14 of an optical element 30, a plurality of cylindrical-shaped holes 31 is arranged in a two-dimensional triangular lattice form in a pitch which is identical to that in a photonic crystal region 13, and these holes 31 are filled with such a material as glass. This material owns a refractive index which is smaller than that of the material in the normal medium region 12 (for example, silicon) and which is larger than that of air.

In the third embodiment, the material whose refractive index, which is smaller than that of the material for constituting the normal medium region 12 and which is larger than that of air, is filled into the holes 31 arranged in the same density as that of the photonic crystal region 13. As a consequence, a mismatching problem of an impedance between the normal medium region 12 and the photonic crystal region 13 may be gradually solved. As a result, a similar effect to that of the first embodiment can be achieved in accordance with this third embodiment. Alternatively, such a material (for example, glass) may be filled into either the holes 16 or the holes 21 arranged in the intermediate region 14 according to the above-described first and second embodiments. In this alternative case, a similar effect may be achieved.

In the first to third embodiments of the present invention, the arrangement form of the holes in the photonic crystal region is not limited to such a two-dimensional triangular lattice form as shown in FIG. 2, but also may be realized by other two-dimensionally periodic forms (for example, two-dimensional cube-lattice form), or three-dimensionally lattice forms. Even in the case where the holes are arranged in the above-described arrangement forms, since the first to third embodiments are applied thereto, similar effects may be achieved.

Alternatively, in the case where the holes and the medium of the photonic crystal region employed in the first to third embodiments are constituted by any materials whose refractive indexes can be changed by an electric field, the optical elements may be used as an optical modulation element, an optical deflection element, or an optical switching element. In detail, while electrodes are mounted on the respective edge surfaces of the photonic crystal region of the optical element in such a manner that these electrodes are opposite to each other, since electric fields are applied among these electrodes so as to change the refractive index of the photonic crystal region, both intensity and a direction of the light which passes through this photonic crystal region may be changed. As a result, the modulation operation of the light, the deflection operation of the light, and the switching operation of the light may be carried out. It should also be noted that as a material whose refractive index may be changed by an electric field, for instance, lithium niobate may be employed.

As previously described in detail, in accordance with the present invention, the reflection loss of the light occurred at the boundary surface between the photonic crystal and the normal medium can be suppressed, and thus, an optical element having the superior transmission characteristic can be provided.

What is claimed is:

1. An optical element comprising:
   a normal medium region having a first refractive index;
   a photonic crystal region having a refractive index which is changed periodically depending upon a position thereof but is not gradually changed, said photonic crystal region having as an averaged refractive index a second refractive index different from said first refractive index; and
   an intermediate region interposed between said normal medium region and said photonic crystal region, said intermediate region having a refractive index which is gradually changed from said first refractive index to said second refractive index.

2. An optical element according to claim 1, wherein:
   said photonic crystal region is constituted in such a manner that, in a first material which constitutes said normal medium region, a second material different from said first material is arranged in a portion of said first material and is varied periodically on the basis of position; and
   said intermediate region is constituted in such a manner that a third material different from said first material is arranged in another portion of said first material in lower density than that of said photonic crystal region and is varied gradually between said first material and said photonic crystal region.

3. An optical element according to claim 1, wherein:
   said photonic crystal region is constituted in such a manner that, in a first material which constitutes said normal medium region, a second material different from said first material is arranged in a portion of said first material and is varied periodically on the basis of position; and
   said intermediate region is constituted in such a manner that a plurality of holes are arranged in another portion of said first material in lower density than that of said photonic crystal region and is varied gradually between said first material and said photonic crystal region.

4. An optical element according to claim 1, wherein:
   said photonic crystal region is constituted in such a manner that a plurality of holes are arranged in a portion of a first material which constitutes said normal medium region and is varied periodically on the basis of position; and
   said intermediate region is constituted in such a manner that a third material different from said first material is arranged in another portion of said first material in lower density than that of said photonic crystal region and is varied gradually between said first material and said photonic crystal region.

5. An optical element according to claim 1, wherein:
   said photonic crystal region is constituted in such a manner that any one of a plurality of holes and a second material different from a first material is arranged in a portion of said first material which constitutes said normal medium region and is varied periodically on the basis of position; and
   said intermediate region is constituted in such a manner that a third material is arranged, said third material having a refractive index which is larger than that of said first material and which is smaller than that of the one of air and said second material and is varied gradually between said first material and said photonic crystal region.

6. An optical element according to claim 1, wherein:
   a ratio of a refractive index of said normal medium region to a refractive index of said photonic crystal region is at least 2.3.

7. An optical element according to claim 1, wherein:
   said optical element corresponds to an optical modulation element employed in an optical modulation.

8. An optical element according to claim 1, wherein:

said optical element corresponds to an optical deflection element for deflecting light in response to at least one of a wavelength of said light and an incident angle of said light.

9. An optical element according to claim 1, wherein:

said optical element corresponds to a switching element.

10. An optical element comprising:

a normal medium region having a first refractive index;

a photonic crystal region having a refractive index which is changed periodically depending upon a position thereof, said photonic crystal region having as an averaged refractive index a second refractive index different from said first refractive index; and an intermediate region interposed between said normal medium region and said photonic crystal region, said intermediate region having a refractive index which is gradually changed from said first refractive index to said second refractive index, wherein:

said photonic crystal region is constituted in such a manner that a plurality of holes are arranged in a portion of a first material which constitutes said normal medium region; and said intermediate region is constituted in such a manner that a plurality of holes are arranged in another portion of said first material and each of the holes arranged in said intermediate region has a shape containing a projection portion which is tapered toward the normal medium region.

11. An optical element according to claim 10, wherein:

an aspect ratio is selected to be at least three, said aspect ratio corresponding to a ratio of a length of the projection portions of the holes arranged on the intermediate region to an arrangement pitch of the holes arranged in the photonic crystal region.

12. An optical element according to claim 10, wherein:

said holes are arranged in a two-dimensional triangular lattice form within said first material in said photonic crystal region.

13. An optical element according to claim 10, wherein:

said first material includes silicon.

14. An optical element comprising:

a normal medium region having a first refractive index;

a photonic crystal region having a refractive index which is changed periodically depending upon a position thereof, said photonic crystal region having as an averaged refractive index a second refractive index different from said first refractive index; and an intermediate region interposed between said normal medium region and said photonic crystal region, said intermediate region having a refractive index which is gradually changed from said first refractive index to said second refractive index, wherein:

said photonic crystal region is constituted in such a manner that, in a first material which constitutes said normal medium region, a second material different from said first material is arranged in a portion of said first material; and said intermediate region is constituted in such a manner that a third material different from said first material is arranged in another portion of said first material; and the third material arranged in said intermediate region has a shape containing a projection portion which is tapered toward said normal medium region.

15. An optical element according to claim 14, wherein:

an aspect ratio is selected to be at least three, said aspect ratio corresponding to a ratio of a length of the projection portions of the third material arranged on the intermediate region to an arrangement pitch of the second material arranged in the photonic crystal region.

16. An optical element comprising:

a normal medium region having a first refractive index;

a photonic crystal region having a refractive index which is changed periodically depending upon a position thereof, said photonic crystal region having as an averaged refractive index a second refractive index different from said first refractive index; and an intermediate region interposed between said normal medium region and said photonic crystal region, said intermediate region having a refractive index which is gradually changed from said first refractive index to said second refractive index, wherein:

said photonic crystal region is constituted in such a manner that, in a first material which constitutes said normal medium region, a second material different from said first material is arranged in a portion of said first material; and said intermediate region is constituted in such a manner that a plurality of holes are arranged in another portion of said first material; and each of the holes arranged in said intermediate region has a shape containing a projection portion which is tapered toward the normal medium region.

17. An optical element according to claim 16, wherein:

an aspect ratio is selected to be at least three, said aspect ratio corresponding to a ratio of a length of the projection portions of the holes arranged on the intermediate region to an arrangement pitch of the second materials arranged in the photonic crystal region.

18. An optical element comprising:

a normal medium region having a first refractive index;

a photonic crystal region having a refractive index which is changed periodically depending upon a position thereof, said photonic crystal region having as an averaged refractive index a second refractive index different from said first refractive index; and an intermediate region interposed between said normal medium region and said photonic crystal region, said intermediate region having a refractive index which is gradually changed from said first refractive index to said second refractive index, wherein:

said photonic crystal region is constituted in such a manner that a plurality of holes are arranged in a portion of a first material which constitutes said normal medium region; and said intermediate region is constituted in such a manner that a third material different from said first material is arranged in another portion of said first material; and the third material arranged in said intermediate region has a shape containing a projection portion which is tapered toward said normal medium region.

19. An optical element according to claim 18, wherein:

an aspect ratio is selected to be at least three, said aspect ratio corresponding to a ratio of a length of the projection portions of the third material arranged on the intermediate region to an arrangement pitch of the holes arranged in the photonic crystal region.

20. An optical element comprising:

a normal medium region having a first refractive index;

a photonic crystal region having a refractive index which is changed periodically depending upon a position thereof, said photonic crystal region having as an averaged refractive index a second refractive index different from said first refractive index; and an intermediate region interposed between said normal medium region and said photonic crystal region, said intermediate region having a refractive index which is gradually changed from said first refractive index to said second refractive index, wherein:

said photonic crystal region is constituted in such a manner that a plurality of holes are arranged in a portion of a first material which constitutes said normal medium region; and said intermediate region is constituted in such a manner that a plurality of holes are arranged in another portion of said first material in lower density than that of said photonic crystal region.

* * * * *